United States Patent [19]

Ohmura

[11] Patent Number: 5,347,742
[45] Date of Patent: Sep. 20, 1994

[54] REEL SEATS FOR USE ON FISHING RODS

[75] Inventor: Ryuichi Ohmura, Shizuoka, Japan

[73] Assignee: Fuji Kogyo Co., Ltd., Shizuoka, Japan

[21] Appl. No.: 38,222

[22] Filed: Mar. 29, 1993

[30] Foreign Application Priority Data

Apr. 28, 1992 [JP] Japan .................................. 4-135914

[51] Int. Cl.⁵ .............................................. A01K 87/06
[52] U.S. Cl. .................................................... 43/22
[58] Field of Search ....................................... 43/22

[56] References Cited

U.S. PATENT DOCUMENTS

| | | | |
|---|---|---|---|
| 3,175,323 | 3/1965 | Axelsson | 43/22 |
| 4,653,217 | 3/1987 | Ohmura | 43/22 X |
| 5,199,207 | 4/1993 | Nakagawa | 43/22 |

FOREIGN PATENT DOCUMENTS 101930  7/1941  Sweden .................................. 43/22

*Primary Examiner*—P. Austin Bradley
*Assistant Examiner*—Jeanne M. Elpel
*Attorney, Agent, or Firm*—Wegner, Cantor, Mueller & Player

[57] ABSTRACT

A reel seat body is provided at one end with an external thread and at the other end with a fixed hood that is to fix a reel leg and is open toward the external thread. An internally threaded tubular body threadedly fitted onto the external thread is provided with a slidable hood that is open toward the fixed hood. The body is provided between the external thread and the fixed hood with a step that abuts on an end of the internally threaded tubular body that defines the end of the slidable hood. Within the fixed hood, there are located a reel leg-engaging member that is slidably displaceable toward or away from the slidable hood and an elastic material for backing up the member.

1 Claim, 1 Drawing Sheet ically, by the provision of this reel seat for fishing rods, any reel leg of varying sizes can be fixed in place in a reliable manner.

REEL SEATS FOR USE ON FISHING RODS

BACKGROUND OF THE INVENTION

The present invention is an improvement relating to a reel seat for use on fishing rods that enables fishing rod reel leg to be attachably and detachably mounted on the fishing rod.

A conventional reel seat for fishing rods includes on a fishing rod-mounting body a step that abuts on the end of a tubular body inserted into a slidable hood and an outer surface that is smoothly contiguous to the outer surface of the slidable hood. The mounting legs of the fishing rod reels are of varying sizes, i.e., long, medium and short sizes.

When a long size mounting leg C of a fishing rod reel is fixed with a fixed hood A and a slidable hood B, as illustrated in FIG. 4, an end D of the slidable hood B will not come in a contact with a step F on a reel seat body E to which the fishing rod is attached, leaving a niche G between the end D and the step F.

According to Japanese Utility Model Laid-Open No. 3-76462, such a niche can be covered by fitting some spacer into that niche G created by various size of reel legs. In order to cover all the widths of niches G must require many sizes of spacers which are likely to be lost during use or storage.

In view of the problems associated with the prior art reel seats for use on fishing rods, an object of the invention is to provide a reel seat for use on a fishing rod, which assures that fixing reel legs of varying lengths.

SUMMARY OF THE INVENTION

According to the invention, the object mentioned above is achieved by the provision of a reel seat for use on a fishing rod, including a reel seat body to be mounted on the fishing rod, which is provided on one end with an external thread and at the other end with a fixed hood for fixing a reel leg, said hood being open toward said external thread; and a slidable hood provided with an internally threaded tubular body threadedly fitted onto said external thread, said slidable hood being open toward said fixed hood; said reel seat body including a step formed between said external thread and said fixed hood, abutting on the end of in said slidable hood, wherein:
  said fixed hood includes a reel leg-engaging member which is slidable toward or away from said slidable hood with an elastic material that backs up said member.

According to the invention, the reel leg-engaging member that is included in the fixed hood is slidably displaceable toward or away from the slidable hood and is backed up by the elastic material, so that, when the reel leg is not in the fixed hood, the reel leg-engaging member is in maximum extended position by the resilient force of the elastic material that backs up the said member.

As the slidable hood is threadedly displaced toward the fixed hood while the reel leg is located between the hoods, the reel leg-engaging member is so engaged with the end of the reel leg which end becomes to be pressed by the resilient force of the elastic material that backs up the reel leg-engaging member. Then, the internally threaded tubular body including the slidable hood can abut on the step of the reel seat body, and when the slidable hood stops in a the threaded displacement, the reel leg can be fixed in place by the resilient force of the elastic material between the slidable hood and the reel leg-engaging member in the fixed hood.

In the invention, the elastic material for backing up the reel leg-engaging member is selected so as to produce a resilient force well-enough to fix the various size of the reel legs.

While the reel leg is fixed in place as mentioned above, the end of the slidable hood is allowed to be contiguous to the outer surface of the reel seat body to form smoothly continuous surface, or, always abut to the step does not make any niche and presents smooth surface between two members.

BRIEF DESCRIPTION OF THE DRAWINGS

The present invention will now be explained, by way of example but not by way of limitation, with reference to the accompanying drawings, in which.

EXPLANATION OF THE PREFERRED EMBODIMENTS

Figure 1:
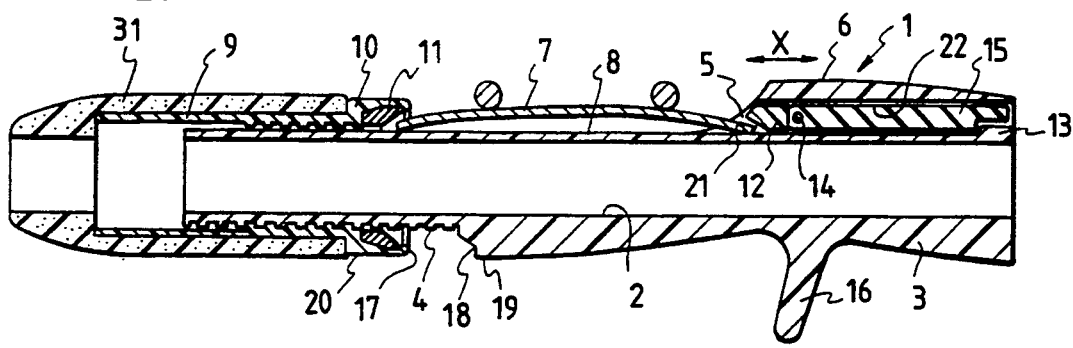
FIG. 1 is a longitudinally sectioned view that illustrates one embodiment of the invention with the reel leg not being fixed.
Figure 2:
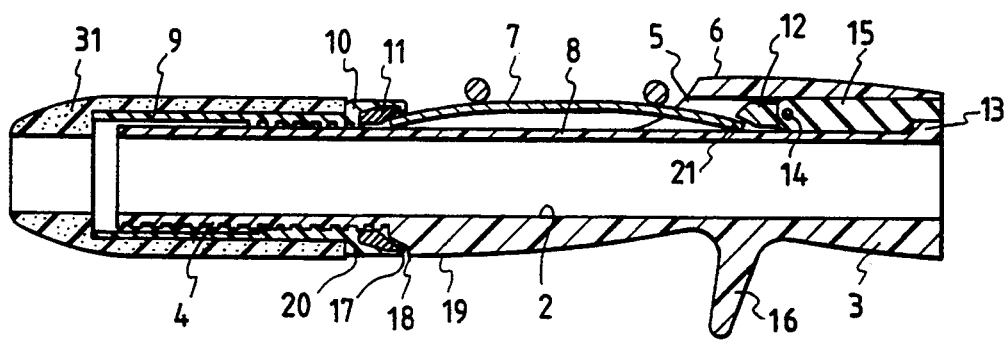
FIG. 2 is a longitudinally sectioned view that illustrates the embodiment of FIG. 1 with the reel leg being fixed in place.

Referring now to FIGS. 1 and 2, there is shown the first embodiment of the invention. As illustrated, a reel seat generally shown at 1, that is designed for use on a fishing rod, is made up of a fishing rod-mounting body 3 that includes a through-hole 2 through which the fishing rod is inserted for attachment thereto and is provided at one end with an external thread 4 and fixedly provided at the other end with a fixed hood 6 that is open at 5 toward the external thread 4. Then, the flat periphery of the fishing rod-mounting body 3 from the opening 5 in the hood 6 to the external thread 4 defines a surface 8 onto which a reel leg 7 of a fishing reel is to be mounted.

An internally threaded tubular body 9 is threadedly fitted by the external thread 4, and is provided on the side facing the fixed hood 6 with an annular, slidable hood 10 having an increased diameter. The slidable hood 10 has a pad 11 received therein.

Onto the internally threaded tubular body 9 there is fixedly fitted a turning, grip pad cylinder 31.

In the fixed hood 6 there is fitted a reel leg-engaging member 12 that is horizontally slidable in the directions shown by a double-headed arrow X, and between a retired site 13 of the fixed hood 6 and the back surface 14 of the reel leg-engaging member 12, there is interposed a backing elastic material 15 such as rubber or urethane, giving a force that permits the reel leg-engaging member 12 to be always directed to the slidable hood 10.

The resilient force of the elastic material 15 is selected so as to assure that, as will be described later, the fishing reel leg 7 is pressed and fixed between the slidable hood 10 and the reel leg-engaging member 12.

In FIG. 1, reference numeral 16 stands for a casting trigger. Needless to say, the trigger may be omitted depending on the purpose of the fishing rod.

FIG. 1 provides an illustration showing the state in which the fishing reel leg 7 is just after it has been mounted on the mounting surface 8 of the fishing rod-mounting body 3. From this location, the internally threaded tubular body 9 is turned to move the slidable hood 10 toward the fixed hood 6 in a threaded manner, until the fishing reel leg 7 is fixed between the pad 11 of the slidable hood 10 and the reel leg-engaging member 12 of the fixed hood 6, as shown in FIG. 2.

In the invention, as shown in FIG. 2, the end 17 of the internal threaded tubular body 9, i.e. a step 18 which the opening end of the slidable hood 10 abuts is formed at the end of the fishing rod-mounting body 3 that terminates at the slidable hood 10 when the slidable hood 10 moves until the fishing reel leg 7 is fixed at the reel leg-engaging member 12 in the fixed hood b. When the end 17 abuts on the step 18, a periphery 19 of the fishing rod-mounting body 3 is made roughly contiguous to a periphery 20 of the tubular body 9, just like a substantially identical plane.

In the arrangement mentioned above, no particular limitation is imposed on the configuration of the reel leg-engaging member 12 in the fixed hood 6, provided that it can engage with the end 21 of the fishing reel leg 7 and fix the end 21. However, it is required that the reel leg-engaging member 12 is shaped so as to slide horizontally within the fixed hood 6 without tilting. It is also required that the fixed hood 6 include a space 22 which is large-enough to permit the elastic material 15 to swell inwardly and outwardly in the radial direction to reduce its length, when the reel leg-engaging member 12 is retracted in the fixed hood 6 by a preset length.

FIG. 2 illustrates the fishing reel leg 7 that is fixed in place while its end 21 is inserted into the fixed hood 6 by a depth of a few tens of millimeters. However, the invention is not limited to such a leg arrangement, and is not limited neither to the depth of the leg 7 is inserted, such depth being varied depending on the length of the leg 7 to be fabricated. In other words, the resilient force of the elastic material 15 should be selected so as to assure whatever depth the leg 7 is inserted and can be fixed in place.

Figure 3:
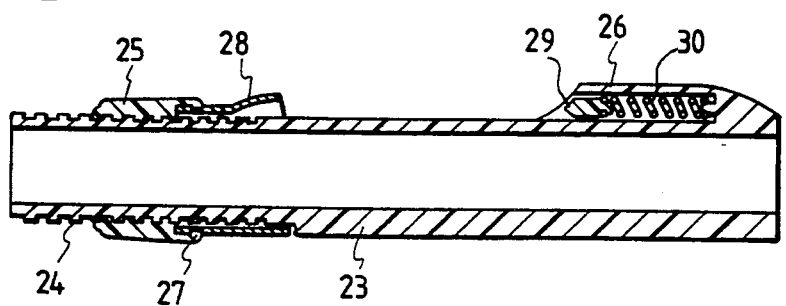
FIG. 3 is a longitudinally sectioned view that illustrates another embodiment of the invention.
Figure 4:
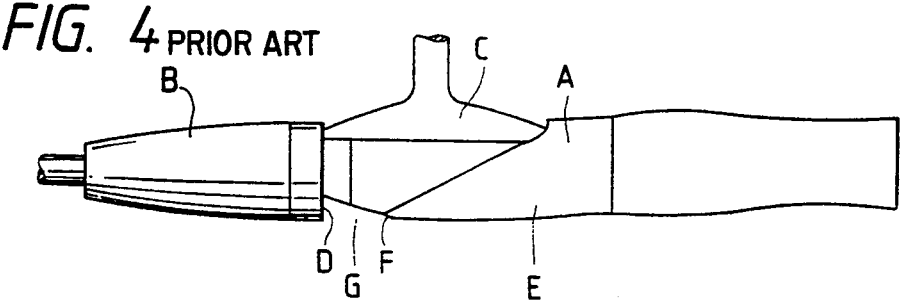
FIG. 4 is a schematic side view that illustrates a conventional fishing rod reel seat.

Referring then to FIG. 3, there is shown the second embodiment of the invention. As illustrated, an internally threaded tube 25 is fitted onto an external thread of a reel seat body 23 to be fitted onto a fishing rod, and a slidable hood 28 is loosely fitted onto an end 27 of the internally threaded tube 25 that faces the slidable hood 28. Threaded movement of the internally threaded tube 25 causes only horizontal movement of the slidable hood 28, and does not permit any turning movement thereof.

A backing elastic material for a reel leg-engaging member 29 received in the fixed hood 26 is made up of a coil spring. It is noted that the same parts as in the first embodiment serves the same purposes.

According to the invention mentioned above and illustrated in the accompanying drawings, the reel leg-engaging member received in the fixed hood can be moved toward or away from the slidable hood by the resilient force of the elastic material that backs up the reel leg-engaging member, and the resilient force of the elastic material enables the fishing reel leg to be fixed between the slidable hood and the reel leg-engaging member. With the reel seat according to the invention, it is possible to make the range of the lengths of fishing reel legs fixed wider than would be possible with a conventional reel seat.

In addition, any niche or recess is unlikely to be formed between the fishing reel seat body and the end of the tube in the slidable hood, when various reel legs of varying lengths are fixed in place. Furthermore, the periphery of the internally threaded tubular body including the slidable hood and the periphery of the reel seat body provide a substantially similar, continuous surface that is free from any recess, keeping the portion of the fishing rod having a fishing reel fixed thereon well-enough comfortable to grip.

What is claimed is:

1. A reel seat for use on a fishing rod comprising:
   (A) a reel seat body to be mounted on the fishing rod, said reel seat body having:
      (1) an external thread on one end thereof,
      (2) a fixed hood for fixing a reel leg at the other end thereof, said fixed hood being open toward said external thread, and
      (3) a reel leg-engaging member disposed in said fixed hood, and slidable toward or away from said slidable hood and normally biased toward said slidable hood;
   (B) a slidable hood provided with an internally threaded tubular body threadedly fitted onto said external thread, said slidable hood being open toward said fixed hood to thereby receive another reel leg and to move toward said fixed hood;
   (C) a step formed on said reel seat body between said external thread and said fixed hood abutting on the end of said internally threaded tubular body received in said slidable hood, whereby, when the slidable hood is moved toward said fixed hood until the first-mentioned reel leg is fixed at the leg-engaging member, said end of said internally threaded tubular body abuts said step, thereby causing the periphery of said body to be roughly contiguous to the periphery of said tubular body; and
   (D) the leg-engaging member is essentially completely disposed within said fixed hood.

* * * * *